(12) United States Patent
Schroeder et al.

(10) Patent No.: US 11,519,343 B2
(45) Date of Patent: Dec. 6, 2022

(54) METHOD FOR OPERATING AN INTERNAL COMBUSTION ENGINE OF A DRIVE SYSTEM FOR A MOTOR VEHICLE, DRIVE SYSTEM, AND MOTOR VEHICLE

(71) Applicant: VOLKSWAGEN AKTIENGESELLSCHAFT, Wolfsburg (DE)

(72) Inventors: Ulrich Schroeder, Braunschweig (DE); Daniel Leineweber, Braunschweig (DE); Christian Dierschke, Goslar (DE); Johannes Forst, Hannover (DE); Michael Tomforde, Gifhorn (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 0 days.

(21) Appl. No.: 16/375,295

(22) Filed: Apr. 4, 2019

(65) Prior Publication Data
US 2019/0309694 A1    Oct. 10, 2019

(30) Foreign Application Priority Data
Apr. 5, 2018   (DE) .................... 10 2018 108 097.2

(51) Int. Cl.
*F02B 3/06* (2006.01)
*F02D 19/06* (2006.01)
(Continued)

(52) U.S. Cl.
CPC ..... *F02D 19/0615* (2013.01); *F02D 19/0642* (2013.01); *F02D 19/088* (2013.01);
(Continued)

(58) Field of Classification Search
CPC . Y02T 10/36; F02D 41/0025; F02D 19/0647; F02D 41/0027
(Continued)

(56) References Cited

U.S. PATENT DOCUMENTS 5,735,253 A * 4/1998 Perotto .................. F02D 37/02
123/406.47
5,755,211 A * 5/1998 Koch .................. F02D 19/0647
123/525
(Continued)

FOREIGN PATENT DOCUMENTS

CN    101131126 A    2/2008
CN    107472239 A    12/2017
(Continued)

OTHER PUBLICATIONS

Search report for German Patent Application No. 10 2018 108 097.2, dated Nov. 29, 2018.
(Continued)

*Primary Examiner* — Long T Tran
*Assistant Examiner* — James J Kim
(74) *Attorney, Agent, or Firm* — Pearl Cohen Zedek Latzer Baratz LLP

(57) ABSTRACT

A method for operating an internal combustion engine of a drive system for a motor vehicle, the internal combustion engine being designed for operation using various types of fuel, has the following steps: querying operating parameters of fuel-relevant functions of the drive system by means of a central fuel coordination device of a central engine coordination device, determining possible types of fuel for operating the internal combustion engine, based on the queried operating parameters and predefined fuel release conditions, by means of the central fuel coordination device, selecting a type of fuel for operating the internal combustion engine,
(Continued)

based on the determined possible types of fuel and at least one predefined selection criterion, by means of the central fuel coordination device, transmitting information identifying the selected type of fuel from the central fuel coordination device to a central engine control unit of the central engine coordination device, and operating the internal combustion engine with the selected type of fuel by means of the central engine control unit.

11 Claims, 2 Drawing Sheets

(51) Int. Cl.
| | | |
|---|---|---|
| | *F02D 19/08* | (2006.01) |
| | *F02D 41/30* | (2006.01) |
| | *F02D 29/02* | (2006.01) |
| | *F02D 41/26* | (2006.01) |
| | *F02D 41/00* | (2006.01) |

(52) U.S. Cl.
CPC ......... *F02D 29/02* (2013.01); *F02D 41/0025* (2013.01); *F02D 41/266* (2013.01); *F02D 41/30* (2013.01); *F02D 19/0647* (2013.01); *F02D 41/0027* (2013.01)

(58) Field of Classification Search
USPC ...................................................... 123/27 GE
See application file for complete search history.

(56) References Cited

U.S. PATENT DOCUMENTS

| | | | | |
|---|---|---|---|---|
| 6,145,494 | A * | 11/2000 | Klopp ..................... | F02D 37/02 123/525 |
| 7,712,451 | B2 * | 5/2010 | Hung .................... | F02B 17/005 123/431 |
| 7,918,207 | B2 * | 4/2011 | Pursifull ................. | F02D 41/20 123/299 |
| 2009/0271090 | A1 | 10/2009 | Surnilla et al. | |
| 2011/0224886 | A1 * | 9/2011 | Wang .................. | F02D 19/0636 701/103 |
| 2012/0145126 | A1 | 6/2012 | Krug et al. | |
| 2012/0158269 | A1 * | 6/2012 | Nakayama .............. | F01N 11/00 701/103 |
| 2014/0000559 | A1 * | 1/2014 | Gutscher ............... | F02D 19/081 123/445 |
| 2015/0279218 | A1 * | 10/2015 | Irrgang ................ | G08G 5/0056 701/3 |
| 2015/0354479 | A1 * | 12/2015 | Lindsay ................ | F02D 41/266 123/480 |
| 2015/0377159 | A1 * | 12/2015 | Fisher ................. | F02D 41/0027 123/525 |
| 2016/0265450 | A1 * | 9/2016 | Takekawa ........... | F02D 19/0647 |
| 2017/0114730 | A1 * | 4/2017 | Laget .................. | F02B 23/0651 |
| 2017/0321616 | A1 * | 11/2017 | Miller .................. | B60W 20/10 |
| 2018/0363569 | A1 * | 12/2018 | Finn .................... | F02D 41/0027 |

FOREIGN PATENT DOCUMENTS

| | | |
|---|---|---|
| DE | 695 05 814 T2 | 4/1999 |
| DE | 199 22 748 A1 | 11/2000 |
| DE | 10 2004 051 287 A1 | 4/2006 |
| DE | 10 2006 025 259 A1 | 12/2007 |
| DE | 10 2009 009 481 A1 | 10/2009 |
| DE | 10 2008 023 306 A1 | 11/2009 |
| DE | 10 2011 075 223 A1 | 11/2012 |
| DE | 11 2011 101 398 T5 | 3/2013 |
| DE | 10 2013 108 443 B3 | 12/2014 |
| EP | 1 255 033 A2 | 11/2002 |

OTHER PUBLICATIONS

Search report for European Patent Application No. 19166978.7, dated Sep. 6, 2019.

Office Action for Chinese Patent Application No. 201910271681.8, dated Jul. 5, 2021.

* cited by examiner

METHOD FOR OPERATING AN INTERNAL COMBUSTION ENGINE OF A DRIVE SYSTEM FOR A MOTOR VEHICLE, DRIVE SYSTEM, AND MOTOR VEHICLE

CROSS-REFERENCE TO RELATED APPLICATIONS

This application claims priority from German Patent Application No. 10 2018 108 097.2, filed Apr. 5, 2018, which is hereby incorporated by reference.

FIELD OF THE INVENTION

The present invention relates to a method for operating an internal combustion engine of a drive system for a motor vehicle. The invention further relates to a drive system for a motor vehicle, having an internal combustion engine and a central engine coordination device for operating the internal combustion engine, the internal combustion engine being designed for operation using various types of fuel. Lastly, the invention relates to a motor vehicle having a drive system with an internal combustion engine and a central engine coordination device for operating the internal combustion engine, the internal combustion engine being designed for operation using various types of fuel.

BACKGROUND OF THE INVENTION

New drive concepts for motor vehicles are continuously being developed to meet increasingly stringent requirements, in particular with regard to fuel consumption, emissions, and economy. As an alternative to conventional internal combustion engines or electric motors, hybrid technology has been developed, according to which at least one internal combustion engine is combined with an electric motor. A fundamental distinction is made between microhybrid, mild hybrid, and full hybrid vehicles.

In addition, internal combustion engines are being developed which are designed to combust different types of fuel, for example natural gas (also known as CNG), and a liquid fuel, in particular a gasoline such as regular unleaded gasoline, premium unleaded gasoline, or the like. These types of internal combustion engines are also referred to as bivalent internal combustion engines, and have combustion chambers in which the various types of fuel may be burned. For introducing the fuels into the combustion chambers, the internal combustion engines usually have separate feed devices for the various types of fuel, for example injection valves for liquid fuel and gas valves for gaseous fuel. Generic internal combustion engines are disclosed in DE 10 2006 025 259 A1, DE 10 2008 023 306 A1, and DE 10 2011 075 223 A1, for example.

Furthermore, known internal combustion engines have a central engine control unit for controlling the supply of fuel to the combustion chambers as well as peripheral functions of the drive system. To be able to select a suitable fuel for an instantaneous operating situation of the drive system, the engine control unit must be linked to the individual fuel-relevant functions. The individual fuel-relevant functions report a fuel type requirement, individually determined by the fuel-relevant function, to the central engine control unit, which evaluates these fuel type requirements and subsequently operates the internal combustion engine with a type of fuel that is compatible with all fuel-relevant functions in this operating state. When the fuel type requirements for various functions conflict with one another, operation with a liquid fuel, in particular gasoline, is typically always possible.

Such drive systems have the disadvantage that the fuel type requirement is provided in a decentralized manner in the respective fuel-relevant functions. Accordingly, the fuel-relevant functions must have a specific software interface.

SUMMARY OF THE INVENTION

The object of the present invention, therefore, is to eliminate or at least partially eliminate the above-described disadvantages during operation of an internal combustion engine of a drive system for a motor vehicle, for a drive system for a motor vehicle, and for a motor vehicle. In particular, the object of the present invention is to provide a method, a drive system, and a motor vehicle that ensure an improved selection of a suitable type of fuel in a simple and cost-effective manner, thereby facilitating communication between the components of the drive system.

The above object is achieved by the patent claims. Accordingly, the object is achieved by a method for operating an internal combustion engine of a drive system for a motor vehicle, by a drive system for a motor vehicle, and by a motor vehicle. Further features and details of the invention result from the description and the drawings. Of course, features and details that are described in conjunction with the method according to the invention also apply in conjunction with the drive system according to the invention and the motor vehicle according to the invention, and in each case vice versa, so that with regard to the disclosure, mutual reference is or may always be made to the individual aspects of the invention.

According to a first aspect of the invention, the object is achieved by a method for operating an internal combustion engine of a drive system for a motor vehicle. The method has the following method steps:
  querying operating parameters of fuel-relevant functions of the drive system by means of a central fuel coordination device of a central engine coordination device,
  determining possible types of fuel for operating the internal combustion engine, based on the queried operating parameters and predefined fuel release conditions, by means of the central fuel coordination device,
  selecting a type of fuel for operating the internal combustion engine, based on the determined possible types of fuel and at least one predefined selection criterion, by means of the central fuel coordination device,
  transmitting information identifying the selected type of fuel from the central fuel coordination device to a central engine control unit of the central engine coordination device, and
  operating the internal combustion engine with the selected type of fuel by means of the central engine control unit.

Within the scope of the invention, "various types of fuel" is understood to mean that the chemical compositions are significantly different from one another, for example natural gas, hydrogen, gasoline, and diesel fuel. Accordingly, E5 and E10 gasolines are considered to be the same according to the invention.

The central fuel coordination device preferably queries operating parameters of fuel-relevant functions of the drive system directly from the individual fuel-relevant functions. This query may take place in the form of bits, for example. This procedure is preferably carried out continuously or repeatedly, in particular at regular or essentially regular intervals. The query may take place in the form of pull queries and/or push queries, in particular when there is a change in operating parameters of the particular fuel-relevant function. The operating parameters of multiple, in particular all, fuel-relevant functions are preferably queried to avoid making an unsuitable fuel selection. Within the scope of the invention, fuel-relevant functions are understood to mean functions of the drive system that affect usability of types of fuel depending on their operating parameters. This may be manifested in such a way that, for example, a fuel-relevant function in an operating state A can be carried out only with a fuel A, and in an operating state B can be carried out with fuel A or a fuel B, or alternatively, only with fuel B. In other words, the suitability of a particular type of fuel depends on the operating state of the fuel-relevant function. The fuel-relevant functions may be, for example, primary functions that have a primary influence on the operation of the internal combustion engine, and secondary functions that affect peripheral aspects of the internal combustion engine, for example an exhaust tract and diagnostic functions of the drive train.

Based on the queried operating parameters and predefined fuel release conditions, the central fuel coordination device determines possible types of fuel for operating the internal combustion engine. This procedure is carried out continuously or repeatedly, in particular at regular or essentially regular intervals. One type of fuel release condition defines, for example, in which operating parameters of a fuel-relevant function particular types of fuel are compatible with this fuel-relevant function. For example, it may be provided that one type of fuel is released over a complete operating range of a fuel-relevant function, while another type of fuel is released only for certain operating parameters of this fuel-relevant function. In this way, the central fuel coordination device determines the types of fuel that are compatible with the individual fuel-relevant functions at that time.

From the determined possible types of fuel, the central fuel coordination device subsequently selects a type of fuel that is to be converted in the internal combustion engine. This procedure is preferably carried out continuously or repeatedly, in particular at regular or essentially regular intervals. The central fuel coordination device hereby takes at least one predefined selection criterion into account. The predefined selection criterion defines, for example, that when all fuel-relevant functions are compatible with fuel A and fuel B, fuel B is preferably usable, for example due to a higher efficiency of the internal combustion engine, lower emissions of the internal combustion engine, higher power of the internal combustion engine, or the like. The predefined selection criterion may also be dependent on operating parameters and/or environmental variables of the motor vehicle, such as vehicle speed, cooling water temperature, state of wear of components of the drive system, slope, type of terrain, or the like. In this way, the central fuel coordination device determines a type of fuel that is preferred for the instantaneous operating parameters.

Information that identifies the selected type of fuel is subsequently transmitted from the central fuel coordination device to a central engine control unit of the central engine coordination device. This transmission may take place, for example, in the form of bits or a bit. This procedure is preferably carried out continuously or repeatedly, in particular at regular or essentially regular intervals. A specific type of fuel specification is thus present at the central engine control unit, which is designed for carrying out appropriate control processes, such as an injection device for fuel.

Lastly, the internal combustion engine is operated with the selected type of fuel by means of the central engine control unit.

A method according to the invention for operating an internal combustion engine of a drive system for a motor vehicle has the advantage over conventional methods that a selection of a type of fuel that is optimized for instantaneous operating parameters is ensured in a cost-effective manner, using simple means. In addition, a complicated direct communication link of the engine control unit to the individual fuel-relevant functions by central bundling via the central fuel coordination device is no longer necessary. The integration of new types of fuel into an existing drive system is likewise improved.

According to one preferred refinement of the invention, in a method it may be provided that a throttle valve and/or a camshaft and/or a turbocharger and/or an injection system are/is used as a fuel-relevant function when querying the operating parameters by means of the central fuel coordination device. An air mass flow rate of aspirated fresh air may be regulated by means of a throttle valve in order to control a quantity of the combustion mixture in the cylinder in a targeted manner. Different air-fuel mixing ratios are necessary for different types of fuel. Accordingly, the throttle valve may have a location or position that is not compatible with at least one type of fuel. The same is true for the turbocharger. A selection of a suitable type of fuel may thus be improved by detecting the operating parameters of the throttle valve. In addition, the camshaft may have damage, for example, so that the internal combustion engine is operable only in an emergency operation. The emergency operation has the advantage that the driver of the motor vehicle can still drive the motor vehicle to a repair shop, for example. Furthermore, it may be provided that one type of fuel is particularly preferred for the emergency operation. A choice of the suitable fuel selection may thus be improved by determining an operating parameter of the camshaft. The injection system preferably has different injection nozzles for different types of fuel. For example, injection nozzles for certain types of fuel, in particular gaseous fuels, may freeze up at particularly low temperatures, so that the use of an alternative type of fuel is preferred. A choice of the suitable fuel selection may thus be improved by determining an operating parameter of the injection system.

According to the invention, it is preferred that a fuel release condition is used that has a pressure and/or a temperature and/or a relative position, in particular an angle, and/or a functionality of the fuel-relevant function. These parameters may be detected in a cost-effective manner, using simple technical means. For example, sensors may be used that are already commonly used in conventional drive systems. For example, if intake nozzles for a gaseous fuel have a lower temperature limit, for example approximately −30° C., there is a risk of the intake nozzles freezing up. For detecting such temperatures, for example a liquid fuel for which such a problem does not occur may be selected. Numerous different fuel-relevant operating parameters are detectable by means of such parameters, so that a choice of a particularly suitable type of fuel is improved in a cost-effective manner, using simple means.

It is also preferred that the predefined selection criterion has a prioritization of types of fuel. A prioritization of types of fuel establishes, for example, which type of fuel should preferably be used in case of doubt, i.e., when several different types of fuel are usable in the instantaneous operating state of the drive system. According to the invention, this may be based on different prioritization criteria, for example fuel cost, fuel availability, cruising range, emissions, expected fuel type limitations, engine power, or the like. According to the prioritization criterion "fuel cost," a type of fuel is preferably selected for which propulsion of the motor vehicle is most favorable. Operating costs for the motor vehicle may thus be reduced. The prioritization feature "fuel availability" takes into account the contents of the motor vehicle fuel tank in prioritizing the type of fuel. Distances from filling stations are preferably also taken into account. For example, if there is a possibility that within a certain cruising range only a certain type of fuel can be refilled, this type of fuel may be given a higher priority. The situation may thus be prevented that a type of fuel is used up and is no longer available, when use of this type of fuel would be particularly advantageous. The prioritization feature "cruising range" allows the preferred use of types of fuel that have a low consumption per distance traveled, so that in particular for fairly long trips, a type of fuel may be prioritized that requires particularly few filling stops. According to the prioritization feature "emissions," for example a type of fuel may be prioritized that has particularly low emissions. This may be advantageous, for example, in cities or nature conservation areas, in particular to avoid possible driving bans. The prioritization feature "expected fuel type limitations" concerns a prediction of a future operating state of the motor vehicle in which only a certain type of fuel is usable, so that an alternative type of fuel is preferably given a higher priority beforehand. According to the prioritization feature "engine power," for example a type of fuel may be prioritized, by means of which a particularly high power may be requested, for example for driving in a sport mode. The prioritization features may, for example, be set or updated manually by the driver, via settings of a driver profile, via information of a navigation system of the motor vehicle, based on information about traffic conditions, in particular with regard to traffic volume, or pollutant levels in the air, fine particle levels, precipitation, or the like. A prioritization thus has the advantage that a selection of a particularly suitable type of fuel is improved, using simple means.

In one particularly preferred embodiment of the invention, in a method it may be provided that at least one gaseous fuel, in particular CNG, and at least one liquid fuel, in particular gasoline, are used as types of fuel. Such types of fuel have the advantage of high availability and different suitabilities for various operating states, so that good synergy effects are achievable.

It is preferred that the transmission of the information identifying the selected type of fuel takes place from the central fuel coordination device to a central operating mode coordination device of the central engine coordination device, the central operating mode coordination device being designed for determining a preferred operating mode of the drive system. In this case, the central engine coordination device has the central fuel coordination device, the central operating mode coordination device, and the central engine control unit. The central operating mode coordination device is designed for determining an operating mode of the internal combustion engine in order to coordinate, for example, competing functions such as diagnostics and cleaning a particle filter by burnoff. In this way, information concerning the individual devices may be centrally combined and distributed in each case, so that connecting further functions to an existing drive system is simplified in a cost-effective manner, using simple means.

The information concerning the selected type of fuel is preferably relayed from the central engine coordination device, in particular the central engine control unit, to the fuel-relevant functions and/or nonfuel-relevant functions of the drive system. In this way, the fuel-relevant functions and/or nonfuel-relevant functions may, for example, be better matched to the selected type of fuel. In addition, the situation may thus be avoided that individual fuel-relevant functions assume an operating state that is not, or is only poorly, suited for use of the selected type of fuel. Disturbance-free operation and overall efficiency of the drive system may thus be improved in a cost-effective manner, using simple means.

According to a second aspect of the invention, the object is achieved by a drive system for a motor vehicle. The drive system has an internal combustion engine and a central engine coordination device with a central engine control unit for operating the internal combustion engine, the internal combustion engine being designed for operation with various types of fuel. According to the invention, the central engine coordination device has a central fuel coordination device that is designed for querying operating parameters of fuel-relevant functions of the drive system and for selecting a suitable type of fuel based on the queried operating parameters. It is further preferred that the drive system has a separate fuel intake device for different types of fuel. The central fuel coordination device is designed for querying operating parameters of fuel-relevant functions of the drive system, in particular directly from the individual fuel-relevant functions, in particular in the form of bits. The central fuel coordination device is preferably designed for carrying out the query in the form of pull queries and/or push queries, in particular when there is a change in operating parameters of the particular fuel-relevant function. In addition, the central fuel coordination device is preferably designed for determining possible types of fuel for operating the internal combustion engine, based on the queried operating parameters and predefined fuel release conditions. More preferably, the central fuel coordination device is designed for selecting, from the determined possible types of fuel, a type of fuel that is to be converted in the internal combustion engine, and for transmitting information identifying the selected type of fuel to a central engine control unit of the engine coordination device, in particular in the form of bits or a bit.

All previously described advantages concerning a method for operating an internal combustion engine of a drive system for a motor vehicle according to the first aspect of the invention also result for the described drive system. Accordingly, the drive system according to the invention has the advantage over conventional drive systems that a selection of a type of fuel that is optimized for instantaneous operating parameters is ensured in a cost-effective manner, using simple means. In addition, a complicated direct communication link of the engine control unit to the individual fuel-relevant functions by central bundling via the central fuel coordination device is no longer necessary. The integration of new types of fuel into an existing drive system is likewise improved.

It is particularly preferred that the central engine coordination device has a central operating mode coordination device for determining a preferred operating mode of the drive system, the drive system being designed for carrying out a method according to the invention. The central engine control unit, the central operating mode coordination device, and the central fuel coordination device are preferably coupled to one another via data interfaces for data exchange.

According to a third aspect of the invention, the object is achieved by a motor vehicle. The motor vehicle has a drive system with an internal combustion engine and a central engine coordination device for operating the internal combustion engine, the internal combustion engine being designed for operation with various types of fuel. According to the invention, the drive system is designed according to a drive system according to the invention.

All previously described advantages concerning a method for operating an internal combustion engine of a drive system for a motor vehicle according to the first aspect of the invention and for a drive system for a motor vehicle according to the second aspect of the invention also result for the described motor vehicle. Accordingly, the motor vehicle according to the invention has the advantage over conventional motor vehicles that a selection of a type of fuel that is optimized for instantaneous operating parameters is ensured in a cost-effective manner, using simple means. In addition, a complicated direct communication link of the engine control unit to the individual fuel-relevant functions by central bundling via the central fuel coordination device is no longer necessary. The integration of new types of fuel into an existing drive system is likewise improved.

BRIEF DESCRIPTION OF THE DRAWINGS

A method according to the invention, a drive system according to the invention, and a motor vehicle according to the invention are explained in greater detail below with reference to schematic drawings that show the following.

DETAILED DESCRIPTION OF THE INVENTION

Figure 1:
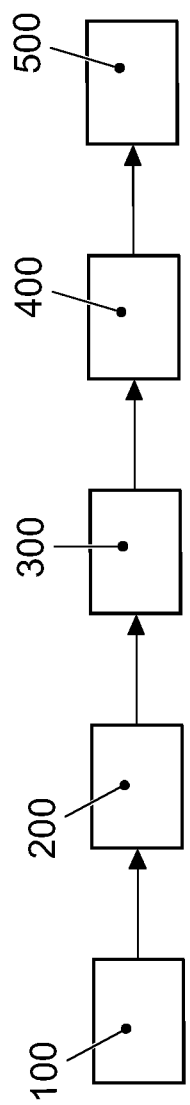
FIG. 1 shows a flow chart of one preferred embodiment of a method according to the invention.
Figure 2:
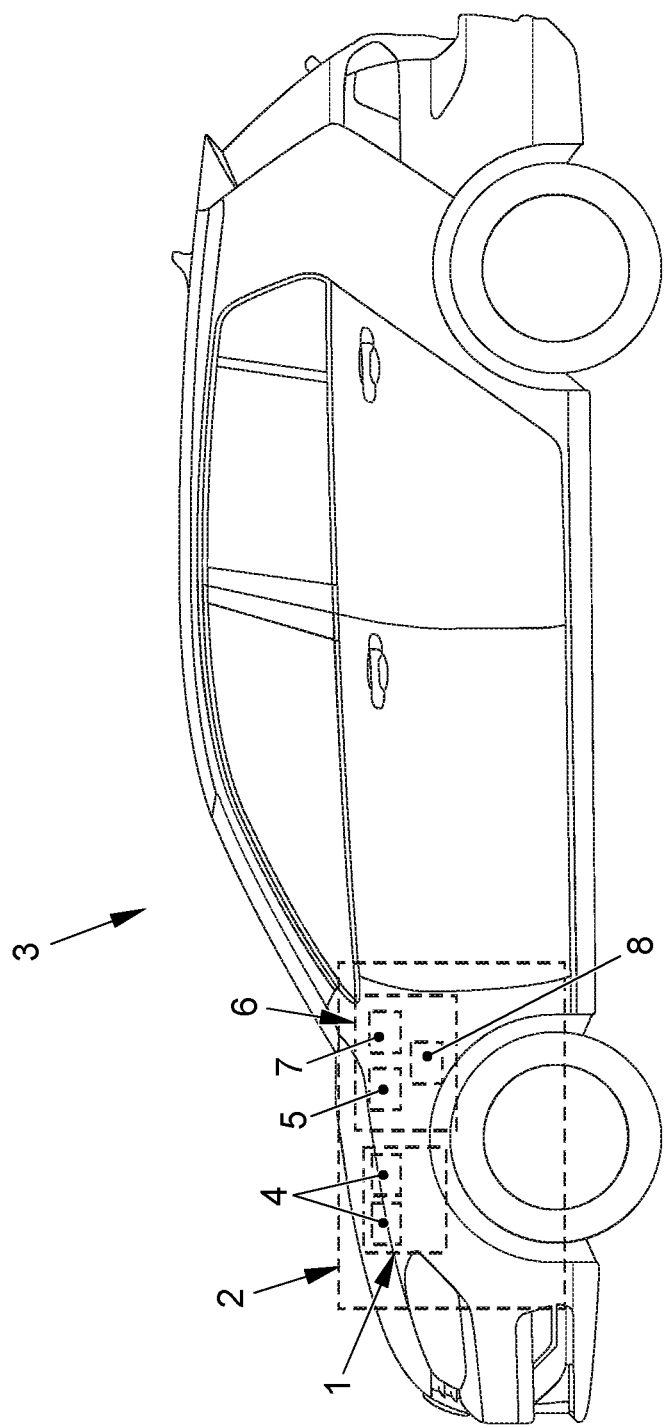
FIG. 2 shows a side view of one preferred embodiment of a motor vehicle according to the invention having a drive system according to the invention.

Elements having identical functions and operating principles are provided with the same reference numerals in each of FIGS. 1 and 2.

FIG. 1 schematically illustrates one preferred embodiment of a method according to the invention in a flow chart. In a first method step 100, operating parameters of fuel-relevant functions 4 (see FIG. 2) of the drive system 2 (see FIG. 2) are queried by means of a central fuel coordination device 5 (see FIG. 2) of a central engine coordination device 6 (see FIG. 2) of a motor vehicle 3 (see FIG. 2). The query may take place, for example, in the push method or pull method, and continuously or discontinuously. In a second method step 200, possible types of fuel for operating the internal combustion engine 1 are determined by means of the central fuel coordination device 5, based on the queried operating parameters and predefined fuel release conditions. The fuel release conditions establish which type of fuel is usable for particular operating parameters of a fuel-relevant function 4. In a third method step 300, a type of fuel for operating the internal combustion engine 1 is selected by means of the central fuel coordination device 5. The selection takes place based on the determined possible types of fuel and at least one predefined selection criterion. The selection criterion establishes, for example, which type of fuel should be selected when the determined operating parameters allow the use of several different types of fuel. If, based on the operating parameters, it is possible to select only one type of fuel, the at least one predefined selection criterion is unnecessary. In a fourth method step 400, information identifying the selected type of fuel is transmitted to a central engine control unit 7 of the central engine coordination device 6 by means of the central fuel coordination device 5. The transmission preferably takes place via a data interface designed for this purpose. In a fifth method step 500, the internal combustion engine 1 is subsequently operated with the selected type of fuel by means of the central engine control unit 7 of the central engine coordination device 6.

FIG. 2 schematically illustrates one preferred embodiment of a motor vehicle 3 according to the invention with a drive system 2 according to the invention, in a side view. The drive system 2 has an internal combustion engine 1 with a plurality of fuel-relevant functions 4, for example a throttle valve, a camshaft, an injection device, or the like, and a central engine coordination device 6 for controlling the internal combustion engine 1. The central engine coordination device 6 has a central fuel coordination device 5 for querying operating parameters of fuel-relevant functions 4 of the drive system 2, for determining possible types of fuel for operating the internal combustion engine 1 based on the queried operating parameters and predefined fuel release conditions, for selecting a type of fuel for operating the internal combustion engine 1 based on the determined possible types of fuel and at least one predefined selection criterion, and for transmitting information identifying the selected type of fuel to the central engine control unit 7 of the central engine coordination device 6. In addition, the central engine coordination device 6 has a central engine control unit 7 for controlling the internal combustion engine 1, and a central operating mode coordination device 8 for determining an operating mode of the drive system 2.

LIST OF REFERENCE NUMERALS 1 internal combustion engine
2 drive system
3 motor vehicle
4 fuel-relevant function
5 central fuel coordination device
6 central engine coordination device
7 central engine control unit
8 central operating mode coordination device
100 first method step
200 second method step
300 third method step
400 fourth method step
500 fifth method step

The invention claimed is:

1. A method for operating an internal combustion engine of a drive system for a motor vehicle, the internal combustion engine being designed for operation using various types of fuel, having the following steps:
  querying operating parameters of fuel-relevant functions of the drive system by means of a central fuel coordination device of a central engine coordination device, wherein the querying is carried out continuously or repeatedly, wherein the fuel-relevant functions are functions of the drive system that affect the usability of types of fuel depending on their operating parameters, and wherein a throttle valve and an injection system are used as a fuel relevant function when querying the operating parameters by means of the central fuel coordination device,
  determining possible types of fuel for operating the internal combustion engine, based on the queried operating parameters and predefined fuel release conditions, by means of the central fuel coordination device, wherein determining possible types of fuel comprises determining if particular types of fuel are compatible with the operating parameters of the fuel-relevant functions, wherein the predefined fuel release condition defines in which operating parameters of a fuel-relevant function particular types of fuel are compatible with this fuel-relevant function, selecting a type of fuel for operating the internal combustion engine, based on the determined possible types of fuel and at least one predefined selection criterion, by means of the central fuel coordination device, wherein the predefined selection criterion defines that, when all fuel-relevant functions are compatible with fuel A and fuel B, fuel B is preferably usable, due to at least one of the following criterion: a higher efficiency of the internal combustion engine, lower emissions of the internal combustion engine or higher power of the internal combustion engine, and wherein the predefined selection criterion is dependent on a state of wear of components on the drive system, transmitting information identifying the selected type of fuel from the central fuel coordination device to a central engine control unit of the central engine coordination device, and operating the internal combustion engine with the selected type of fuel by means of the central engine control unit.

2. The method according to claim 1, wherein a fuel release condition is used that has a pressure and/or a temperature and/or a relative position and/or a functionality of the fuel-relevant function.

3. The method according to claim 2, wherein the relative position is an angle.

4. The method according to claim 1, wherein the predefined selection criterion has a prioritization of types of fuel.

5. The method according to claim 1, wherein at least one gaseous fuel and at least one liquid fuel are used as types of fuel.

6. The method according to claim 5, wherein the at least one gaseous fuel is CNG.

7. The method according to claim 5, wherein the at least one liquid fuel is gasoline.

8. The method according to claim 1, wherein the transmission of the information identifying the selected type of fuel takes place from the central fuel coordination device to a central operating mode coordination device of the central engine coordination device, the central operating mode coordination device being designed for determining a preferred operating mode of the drive system.

9. The method according to claim 1, further comprising relaying the information concerning the selected type of fuel from the central engine coordination device, in particular a central engine control unit, to the fuel-relevant functions and/or nonfuel-relevant functions of the drive system.

10. A drive system for a motor vehicle, having:
an internal combustion engine, and
a central engine coordination device with a central engine control unit for operating the internal combustion engine,
wherein the internal combustion engine is designed for operation using various types of fuel,
wherein the central engine coordination device has a central fuel coordination device that is designed for querying operating parameters of fuel-relevant functions of the drive system and for selecting a suitable type of fuel based on the queried operating parameters,
wherein the central engine coordination device has a central operating mode coordination device for determining a preferred operating mode of the drive system, and
wherein the drive system being designed for carrying out a method according to claim 1.

11. A motor vehicle, having:
a system designed according to a drive system according to claim 10,
wherein the internal combustion engine is designed for operation using various types of fuel.

\* \* \* \* \*